United States Patent
Takeuchi et al.

(10) Patent No.: US 12,174,476 B2
(45) Date of Patent: Dec. 24, 2024

(54) LIGHT ADJUSTMENT DEVICE AND LIGHT ADJUSTMENT DEVICE MANUFACTURING METHOD

(71) Applicant: Japan Display Inc., Tokyo (JP)

(72) Inventors: Shunpei Takeuchi, Tokyo (JP); Kohei Yamaguchi, Tokyo (JP); Katsuichi Ide, Tokyo (JP); Yukiya Hirabayashi, Tokyo (JP); Osamu Kai, Tokyo (JP); Hiroya Morimoto, Tokyo (JP); Koichi Nagao, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/347,586

(22) Filed: Jul. 6, 2023

(65) Prior Publication Data

US 2024/0012276 A1    Jan. 11, 2024

(30) Foreign Application Priority Data

Jul. 7, 2022    (JP) .................................. 2022-109594

(51) Int. Cl.
| | |
|---|---|
| G02F 1/1333 | (2006.01) |
| G02F 1/1339 | (2006.01) |
| G02F 1/1341 | (2006.01) |
| G02F 1/1347 | (2006.01) |

(52) U.S. Cl.
CPC .... *G02F 1/133354* (2021.01); *G02F 1/13394* (2013.01); *G02F 1/1341* (2013.01); *G02F 1/1347* (2013.01); *G02F 1/133305* (2013.01); *G02F 2201/56* (2013.01)

(58) Field of Classification Search
CPC ............... G02F 1/1347; G02F 1/13471; G02F 1/133308; G02F 1/133322; G02F 2201/56
See application file for complete search history.

(56) References Cited

U.S. PATENT DOCUMENTS

| | | | |
|---|---|---|---|
| 2008/0018557 A1* | 1/2008 | Maeda | .................... G02F 1/167 |
| | | | 345/55 |
| 2022/0101810 A1* | 3/2022 | Lin | ....................... G09G 3/3406 |

FOREIGN PATENT DOCUMENTS

| | | |
|---|---|---|
| JP | 2004-333567 A | 11/2004 |
| JP | WO2008111214 A1 * | 9/2008 |

* cited by examiner

*Primary Examiner* — Jessica M Merlin
(74) *Attorney, Agent, or Firm* — XSENSUS LLP

(57) ABSTRACT

A light adjustment device includes a panel unit having a rectangular pillar shape and including a plurality of light adjustment panels stacked in a first direction, each light adjustment panel having a polygonal shape and including a lower substrate and an upper substrate overlapping the lower substrate. The light adjustment panels each have a first side, a second side adjacent to the first side, and a first corner at which the first side intersects the second side, and when two light adjustment panels adjacent to each other in a first direction among the light adjustment panels are viewed in the first direction, the first corner of one of the light adjustment panels is positioned inside of an edge of the other light adjustment panel, and the first corner of the other light adjustment panel is positioned inside of an edge of the one light adjustment panel.

2 Claims, 14 Drawing Sheets

LIGHT ADJUSTMENT DEVICE AND LIGHT ADJUSTMENT DEVICE MANUFACTURING METHOD

CROSS-REFERENCE TO RELATED APPLICATION

This application claims the benefit of priority from Japanese Patent Application No. 2022-109594 filed on Jul. 7, 2022, the entire contents of which are incorporated herein by reference.

BACKGROUND

1. Technical Field

The present disclosure relates to a light adjustment device and a light adjustment device manufacturing method.

2. Description of the Related Art

A light adjustment device includes, for example, a panel unit including a plurality of light adjustment panels stacked in the up-down direction (refer to Japanese Patent Application Laid-open Publication No. 2004-333567 (JP-A-2004-333567), for example). The light adjustment panel includes a plurality of substrates, and a seal material and a liquid crystal layer that are encapsulated between the substrates. When the light adjustment panel has, for example, a polygonal shape, a sharp corner is provided at each intersection part between two adjacent sides of the light adjustment panel.

When a corner of a light adjustment panel protrudes from a side part of a panel unit, the corner is potentially damaged due to interference with another component or the like.

The present disclosure is made in view of the above-described problem and intended to provide a light adjustment device and a light adjustment device manufacturing method with which protrusion of a corner of a light adjustment panel from a side part of a panel unit is reduced.

SUMMARY

A light adjustment device according to an embodiment of the present disclosure includes a panel unit having a rectangular pillar shape and including a plurality of light adjustment panels stacked in a first direction, each light adjustment panel having a polygonal shape and including a lower substrate and an upper substrate overlapping the lower substrate. The light adjustment panels each have a first side, a second side adjacent to the first side, and a first corner at which the first side intersects the second side, and when two light adjustment panels adjacent to each other in a first direction among the light adjustment panels are viewed in the first direction, the first corner of one of the light adjustment panels is positioned inside of an edge of the other light adjustment panel, and the first corner of the other light adjustment panel is positioned inside of an edge of the one light adjustment panel.

A light adjustment device manufacturing method according to an embodiment of the present disclosure includes a base material preparation process of preparing a base material including a seal material and a liquid crystal layer between two translucent substrates having rectangular shapes and placed over each other in a first direction, the liquid crystal layer filling inside of the seal material, after the base material preparation process, a light adjustment panel cut-out process of cutting out one light adjustment panel having a polygonal shape from the base material by providing a first slit from an end face of each translucent substrate in a direction intersecting the end face and then continuously forming slits up to the end face along an outer periphery of the seal material, the polygonal shape having the end face as one side, a light adjustment panel production process of producing a plurality of the light adjustment panels by repeatedly performing the light adjustment panel cut-out process, and a stacking process of stacking the light adjustment panels in the first direction after the light adjustment panel production process. In the light adjustment panel cut-out process, a first corner at which the first slit intersects the end face is formed on each light adjustment panel, and in the stacking process, when two light adjustment panels adjacent to each other in a first direction among the light adjustment panels are viewed in the first direction, the first corner of one of the light adjustment panels is positioned inside of an edge of the other light adjustment panel, and the first corner of the other light adjustment panel is positioned inside of an edge of the one light adjustment panel.

DETAILED DESCRIPTION

Figure 1:
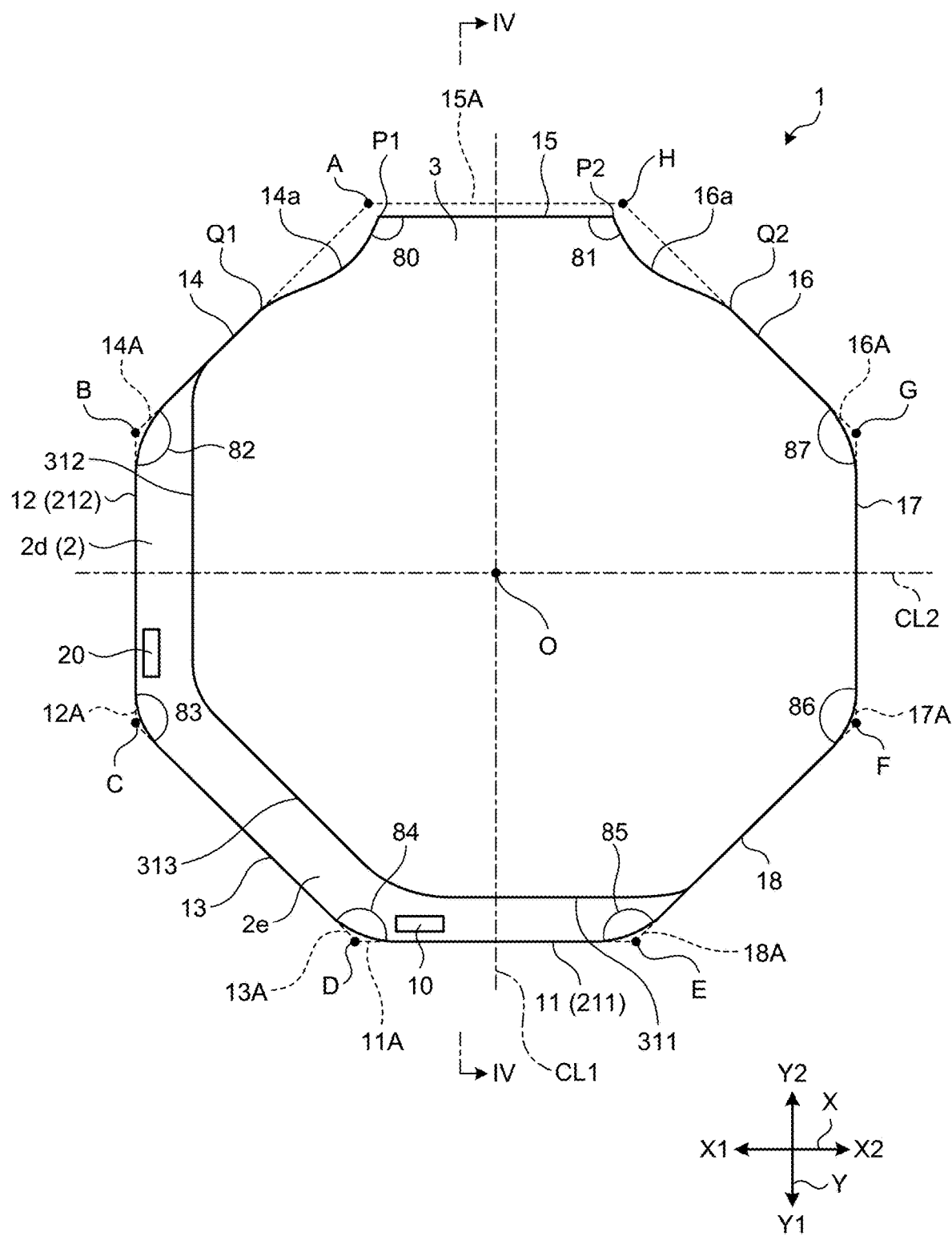
FIG. 1 is a schematic diagram of a light adjustment panel according to an embodiment when viewed from the upper side.

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate.

What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

In an XYZ coordinate system illustrated in the drawings, an X direction is the right-left direction, and an X1 side is opposite an X2 side. The X1 side is also referred to as a left side, and the X2 side is also referred to as a right side. A Y direction is the front-back direction, and a Y1 side is opposite a Y2 side. The Y1 side is also referred to as a front side, and the Y2 side is also referred to as a back side. A Z direction is the up-down direction (stacking direction). A Z1 side is opposite a Z2 side. The Z1 side is also referred to as an upper side, and the Z2 side is also referred to as a lower side. The Z direction is also referred to as a first direction, and the X and Y directions are also referred to as a second direction. The Z2 side is also referred to as one side in the first direction, and the Z1 side is also referred to as the other side in the first direction.

Light Adjustment Device

Figure 2:
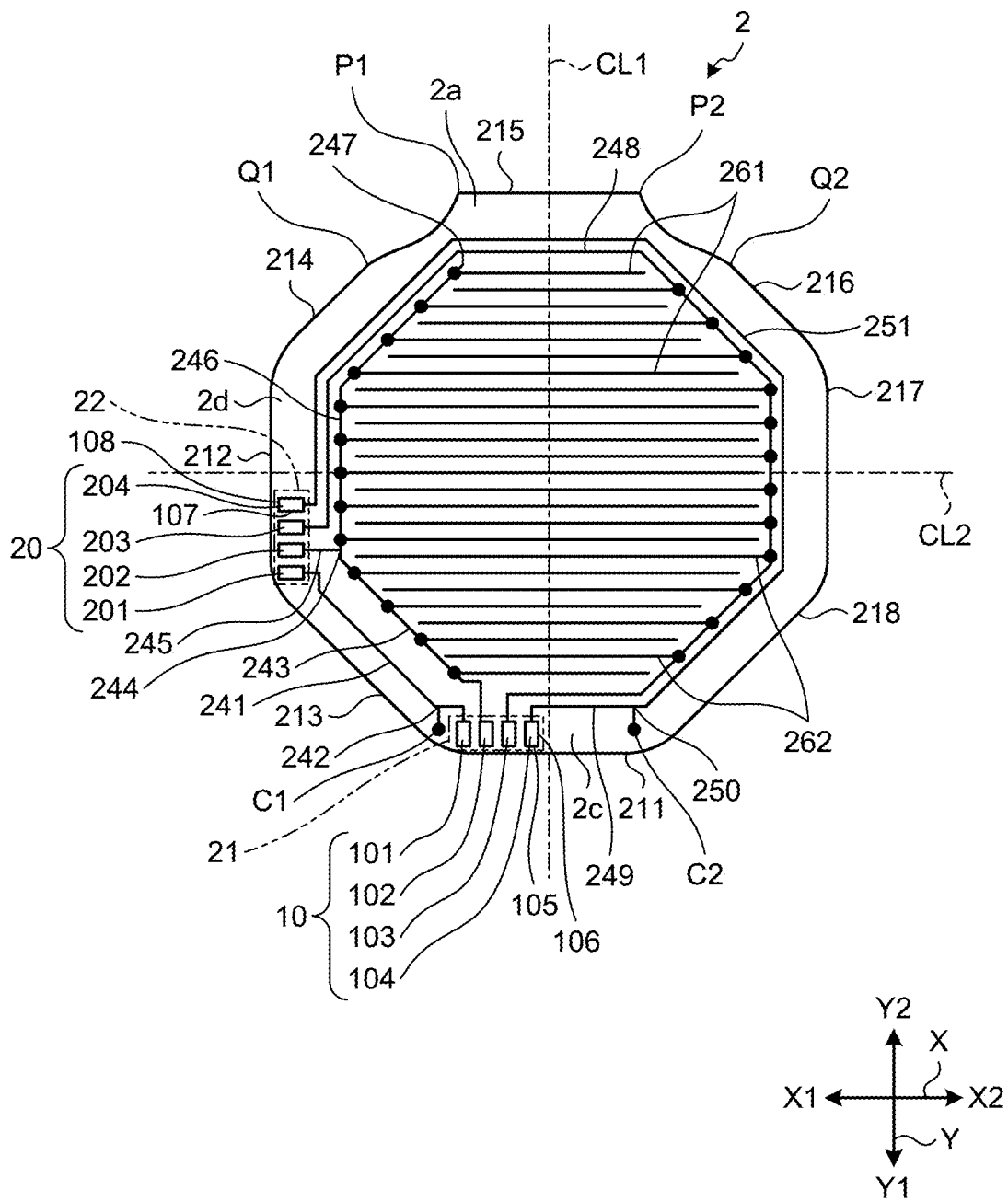
FIG. 2 is a schematic diagram of the front surface of a lower substrate according to the embodiment when viewed from the upper side.
Figure 3:
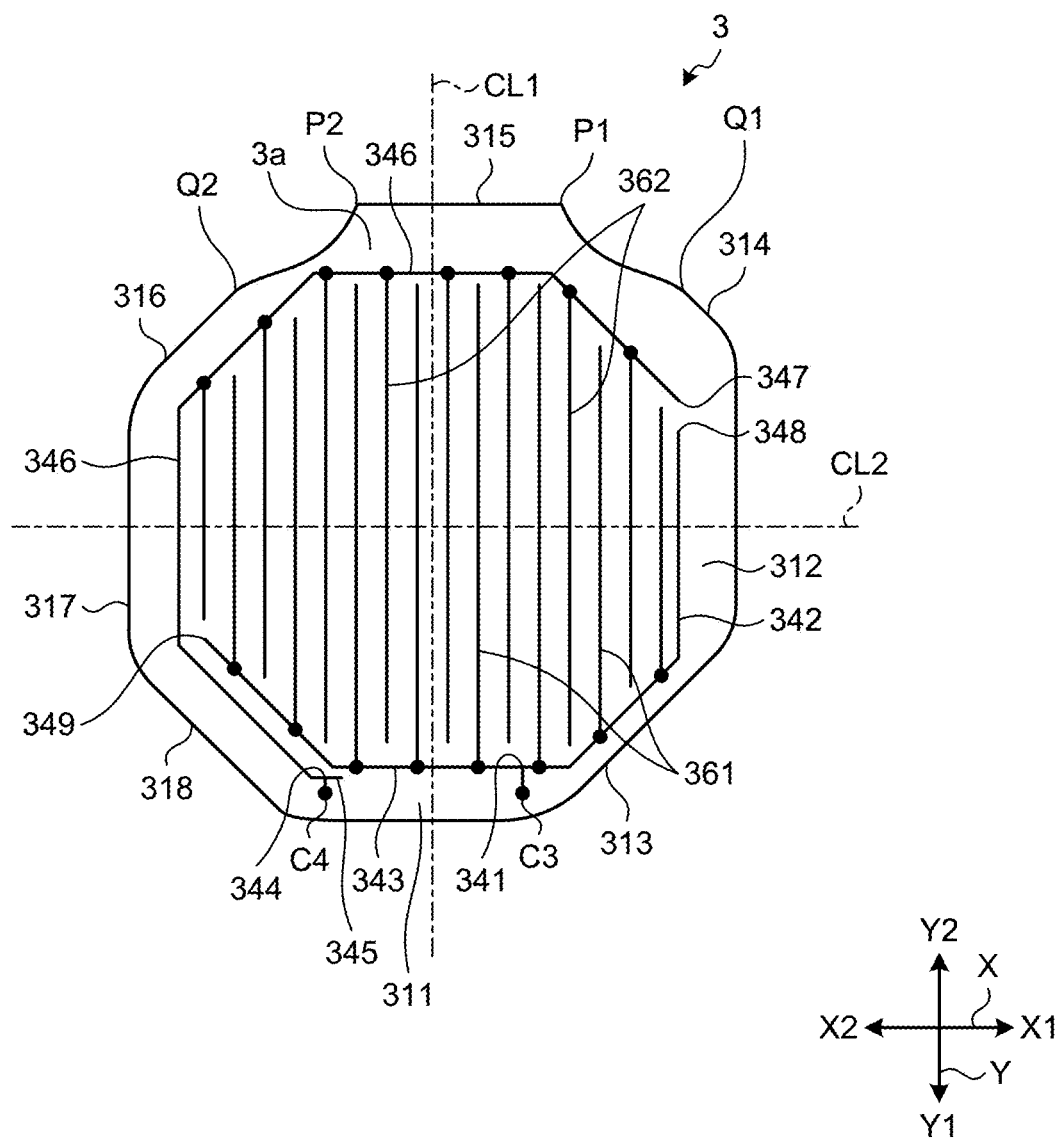
FIG. 3 is a schematic diagram of an upper substrate according to the embodiment when turned over, illustrating its front surface on which wires are provided.

The following describes a light adjustment device according to the embodiment. FIG. 1 is a schematic diagram of a light adjustment panel according to the embodiment when viewed from the upper side. FIG. 2 is a schematic diagram of the front surface of a lower substrate according to the embodiment when viewed from the upper side. FIG. 3 is a schematic diagram of an upper substrate according to the embodiment when turned over, illustrating its front surface on which wires are provided.

As illustrated in FIG. 1, a light adjustment panel 1 includes a lower substrate 2 and an upper substrate 3 disposed on the upper side of the lower substrate 2. The light adjustment panel 1 has a substantially octagonal shape in a plan view and has a side 11, a side 12, a side 13, a side 14, a side 15, a side 16, a side 17, and a side 18. A virtual regular octagon along the outer shape of the light adjustment panel 1 is illustrated with dashed lines to more clearly illustrate the outer shape of the light adjustment panel 1. The regular octagon illustrated with dashed lines and has apexes A, B, C, D, E, F, G, and H. The eight corners of the light adjustment panel 1 have circular arc shapes. Accordingly, the eight corners of the light adjustment panel 1 are positioned on a center O side of the apexes of the regular octagon illustrated with dashed lines. The side 15 of the light adjustment panel 1 corresponds to a side 15A of the regular octagon on the Y2 side. The side 15 of the light adjustment panel 1 is positioned on the Y1 side of the side 15A of the regular octagon on the Y2 side. In the present invention, the shape of the light adjustment panel 1 is not limited to an octagonal shape but includes a polygonal shape other than an octagonal shape.

The side 11 is positioned on the Y1 side in the light adjustment panel 1. The side 11 is parallel to the X direction in the drawing. The side 11 of the light adjustment panel 1 coincides with a side 211 of the lower substrate 2 illustrated in FIG. 2. A side 311 of the upper substrate 3 illustrated in FIG. 3 is positioned on the Y2 side of the side 211 of the lower substrate 2. Thus, as illustrated in FIG. 1, an end part 2c of the lower substrate 2 on the Y1 side is exposed when the upper substrate 3 is stacked on the upper side of the lower substrate 2. A first terminal group 10 is provided at the end part 2c.

The side 12 is positioned on the X1 side in the light adjustment panel 1. The side 12 is parallel to the Y direction in the drawing. The side 12 of the light adjustment panel 1 coincides with a side 212 of the lower substrate 2 illustrated in FIG. 2. A side 312 of the upper substrate 3 illustrated in FIG. 3 is positioned on the X2 side of the side 212 of the lower substrate 2. Thus, as illustrated in FIG. 1, an end part 2d of the lower substrate 2 on the X1 side is exposed when the upper substrate 3 is stacked on the upper side of the lower substrate 2. A second terminal group 20 is provided at the end part 2d.

The side 13 intersects both the X1 and Y1 directions. The intersection angle is 45°. The side 13 coincides with a side 213 of the lower substrate 2 illustrated in FIG. 2. A side 313 of the upper substrate 3 illustrated in FIG. 3 is positioned on the X2 and Y2 sides of the side 213 of the lower substrate 2. In other words, the side 313 of the upper substrate 3 is positioned on the center O side of the side 213 of the lower substrate 2 in a plan view. Thus, as illustrated in FIG. 1, an end part 2e of the lower substrate 2 is exposed when the upper substrate 3 is stacked on the upper side of the lower substrate 2.

The side 14 intersects both the X1 and Y2 directions. The intersection angle is 45°. The side 14 overlaps a side 214 of the lower substrate 2 illustrated in FIG. 2 and a side 314 of the upper substrate 3 illustrated in FIG. 3.

The side 15 is positioned on the Y2 side in the light adjustment panel 1. The side 15 overlaps a side 215 of the lower substrate 2 illustrated in FIG. 2 and a side 315 of the upper substrate 3 illustrated in FIG. 3. As described above, the side 15 of the light adjustment panel 1 is positioned on the Y1 side (center O side) of the side 15A of the regular octagon on the Y2 side.

The side 16 intersects both the X2 and Y2 directions. The intersection angle is 45°. The side 16 overlaps a side 216 of the lower substrate 2 illustrated in FIG. 2 and a side 316 of the upper substrate 3 illustrated in FIG. 3.

The side 17 is positioned on the X2 side in the light adjustment panel 1. The side 17 overlaps a side 217 of the lower substrate 2 illustrated in FIG. 2 and a side 317 of the upper substrate 3 illustrated in FIG. 3.

The side 18 intersects both the X2 and Y1 directions. The intersection angle is 45°. The side 18 overlaps a side 218 of the lower substrate 2 illustrated in FIG. 2 and a side 318 of the upper substrate 3 illustrated in FIG. 3.

As described above, the first terminal group 10 provided at the end part 2c of the lower substrate 2 and the second terminal group 20 provided at the end part 2d of the lower substrate 2 are exposed since the area of the upper substrate 3 is smaller than the area of the lower substrate 2.

The following describes the lower substrate 2 and the upper substrate 3 with reference to FIGS. 2 and 3. FIG. 3 is a schematic diagram illustrating a front surface 3a on which wires are provided among the front and back surfaces of the upper substrate 3. Accordingly, the X1 and X2 directions of the upper substrate 3 in FIG. 3 are opposite the X1 and X2 directions of the lower substrate 2 in FIG. 2. FIG. 2 illustrates a central line CL1 extending in the Y direction through the center of the lower substrate 2 in the X direction, and a central line CL2 extending in the X direction through the center of the lower substrate 2 in the Y direction. As illustrated in FIG. 2, the first terminal group 10 is provided at a first end part 21 (illustrated with dashed and double-dotted lines) on the side 212 side (or the side 213 side) of the center of the side 211 in the end part 2c along the side 211 of the lower substrate 2. In other words, the end part 2c is an end part of the lower substrate 2 on the Y1 side, and the first end part 21 illustrated with dashed and double-dotted lines is disposed on the X1 side of the central line CL1 among sites of the end part 2c. The first terminal group 10 is provided at the first end part 21. As illustrated in FIG. 2, the first terminal group 10 includes a first terminal 101, a second terminal 102, a third terminal 103, and a fourth terminal 104. The first terminal 101, the second terminal 102, the third terminal 103, and the fourth terminal 104 are sequentially arranged in the X direction (fourth direction) from the X1 side toward the X2 side. The terminals 101, 102, 103, and 104 each have a pair of short sides 105 parallel to the side 211 and a pair of long sides 106 parallel to the side 212.

As illustrated in FIG. 2, the second terminal group 20 is provided at a second end part 22 (illustrated with dashed and double-dotted lines) on the side 211 side (or the side 213 side) of the center of the side 212 in the end part 2d along the side 212 of the lower substrate 2. In other words, the end part 2d is an end part of the lower substrate 2 on the X1 side, and the second end part 22 illustrated with dashed and double-dotted lines is disposed on the Y1 side of the central line CL2 among sites of the end part 2d. The second terminal group 20 is provided at the second end part 22. As illustrated in FIG. 2, the second terminal group 20 includes a fifth terminal 201, a sixth terminal 202, a seventh terminal 203, and an eighth terminal 204. The fifth terminal 201, the sixth terminal 202, the seventh terminal 203, and the eighth terminal 204 are sequentially arranged from the Y1 side toward the Y2 side in the front-back direction (Y direction). The terminals 201, 202, 203, and 204 each have a pair of long sides 107 parallel to the side 211 and a pair of short sides 108 parallel to the side 212.

The following describes wires on the lower substrate 2 and the upper substrate 3. Wires are provided on a front surface among the front and back surfaces of each substrate. In other words, a surface on which wires are provided is referred to as the front surface, and a surface opposite to the front surface is referred to as the back surface.

As illustrated in FIG. 2, wires, liquid crystal drive electrodes, and coupling portions are provided on a front surface 2a of the lower substrate 2. A coupling portion C1 of the lower substrate 2 and a coupling portion C3 of the upper substrate 3 (refer to FIG. 3) are electrically coupled to each other through a conductive pillar (not illustrated) through which conduction is possible. Similarly, a coupling portion C2 of the lower substrate 2 and a coupling portion C4 of the upper substrate 3 (refer to FIG. 3) are electrically coupled to each other through a common electrode (not illustrated) through which conduction is possible.

The first terminal 101 and the fifth terminal 201 are electrically coupled to each other through a wire (first wire) 241. A bifurcation point 242 is provided halfway through the wire 241, and a wire extends from the bifurcation point 242 to the coupling portion C1.

The second terminal 102 and the sixth terminal 202 are electrically coupled to each other through wires (second wires) 243 and 245. A bifurcation point 244 is provided on the wire 243, and a wire 246 extends from the bifurcation point 244 to an end 247.

The third terminal 103 and the seventh terminal 203 are electrically coupled to each other through a wire (third wire) 248. The fourth terminal 104 and the eighth terminal 204 are electrically coupled to each other through wires (fourth wires) 249 and 251. The wire 249 extends toward the X2 side from the fourth terminal 104 to a bifurcation point 250. The wire 251 extends from the bifurcation point 250 to the eighth terminal 204. A wire extends from the bifurcation point 250 to the coupling portion C2.

A plurality of liquid crystal drive electrodes 261 are coupled to the wires 243 and 246. The liquid crystal drive electrodes 261 extend straight in the X direction. The liquid crystal drive electrodes 261 are disposed at equal intervals in the Y direction.

A plurality of liquid crystal drive electrodes 262 are coupled to the wire 248. The liquid crystal drive electrodes 262 extend straight in the X direction. The liquid crystal drive electrodes 262 are disposed at equal intervals in the Y direction. The liquid crystal drive electrodes 261 and 262 are alternately arranged in the Y direction.

As illustrated in FIG. 3, wires, liquid crystal drive electrodes, and coupling portions are provided on the front surface 3a of the upper substrate 3. Central lines CL1 and CL2 illustrated in FIG. 3 correspond to the central lines CL1 and CL2 illustrated in FIG. 2.

The coupling portion C3 is coupled to wires 342 and 343 through a bifurcation point 341. The wire 342 extends to an end 348. The wire 343 extends to an end 349. The coupling portion C4 is coupled to wires 345 and 346 through a bifurcation point 344. The wire 346 extends to an end 347.

A plurality of liquid crystal drive electrodes 361 are coupled to the wires 342 and 343. The liquid crystal drive electrodes 361 extend straight in the Y direction. The liquid crystal drive electrodes 361 are disposed at equal intervals in the X direction.

A plurality of liquid crystal drive electrodes 362 are coupled to the wire 346. The liquid crystal drive electrodes 362 extend straight in the Y direction. The liquid crystal drive electrodes 362 are disposed at equal intervals in the X direction. The liquid crystal drive electrodes 361 and 362 are alternately arranged in the X direction.

Figure 4:
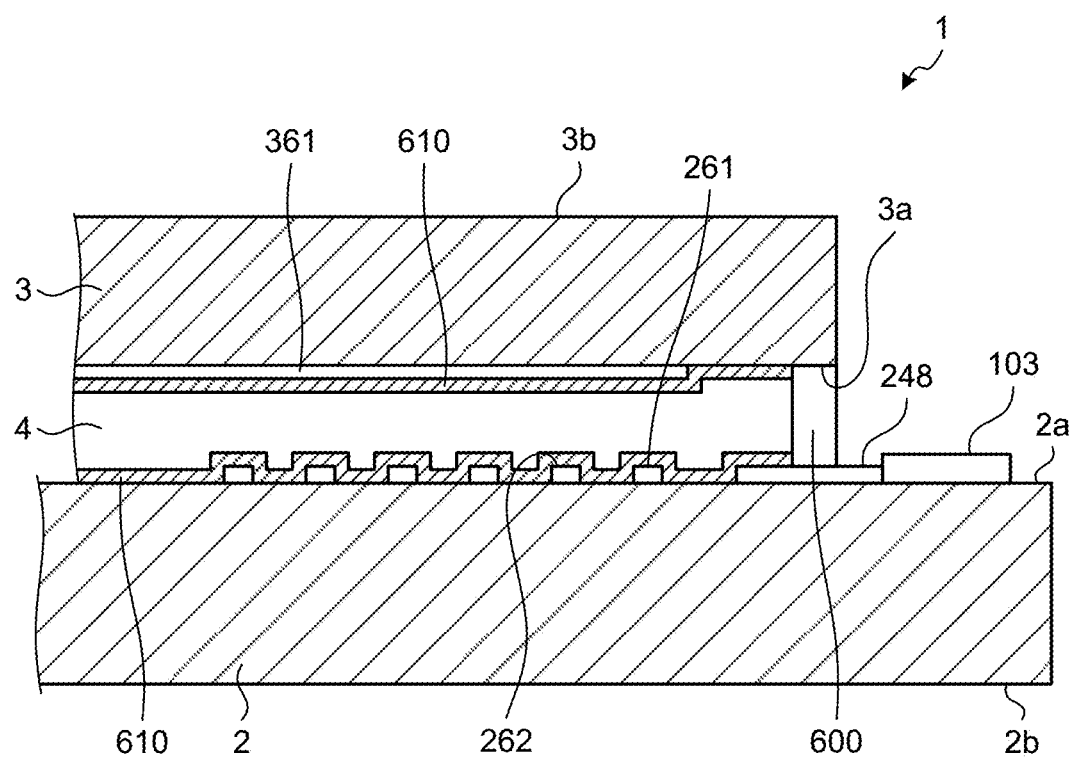
FIG. 4 is a sectional view along line IV-IV in FIG. 1.
Figure 4:
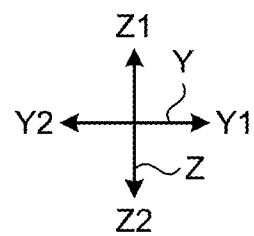

The following briefly describes a sectional structure of the light adjustment panel 1. FIG. 4 is a sectional view taken along line IV-IV in FIG. 1. As illustrated in FIG. 4, the light adjustment panel 1 includes the lower substrate 2, the upper substrate 3, and a liquid crystal layer 4. As illustrated in FIG. 4, the upper substrate 3 is disposed on the upper side (Z1 side) of the lower substrate 2. The liquid crystal layer 4 is provided between the upper substrate 3 and the lower substrate 2. Specifically, the front surface 2a of the lower substrate 2 and the front surface 3a of the upper substrate 3 face each other with the liquid crystal layer 4 interposed therebetween. The lower substrate 2 has a back surface 2b opposite the front surface 2a, and the upper substrate 3 has a back surface 3b opposite the front surface 3a. Since the area of the upper substrate 3 is smaller than the area of the lower substrate 2 as described above, the third terminal 103 provided on the front surface 2a of the lower substrate 2 is exposed. An insulating layer, which is provided to prevent contact between two wires, is not provided in the light adjustment panel 1 according to the present embodiment because no wires on the lower substrate 2 overlap each other.

In addition, alignment films 610 are stacked on both substrates and the electrodes as illustrated in FIG. 4. Specifically, one of the alignment films 610 is stacked on the front surface 2a of the lower substrate 2 and the upper surfaces of the liquid crystal drive electrodes 261 and 262 and part of the third wire 248. The other alignment film 610 is stacked on the front surface 3a of the upper substrate 3 and the upper surfaces of the liquid crystal drive electrodes 361. The lower substrate 2 and the upper substrate 3 are bonded to each other by a seal material 600 enclosing an effective region, and the liquid crystal layer 4 fills the inside of the seal material 600.

Figure 5:
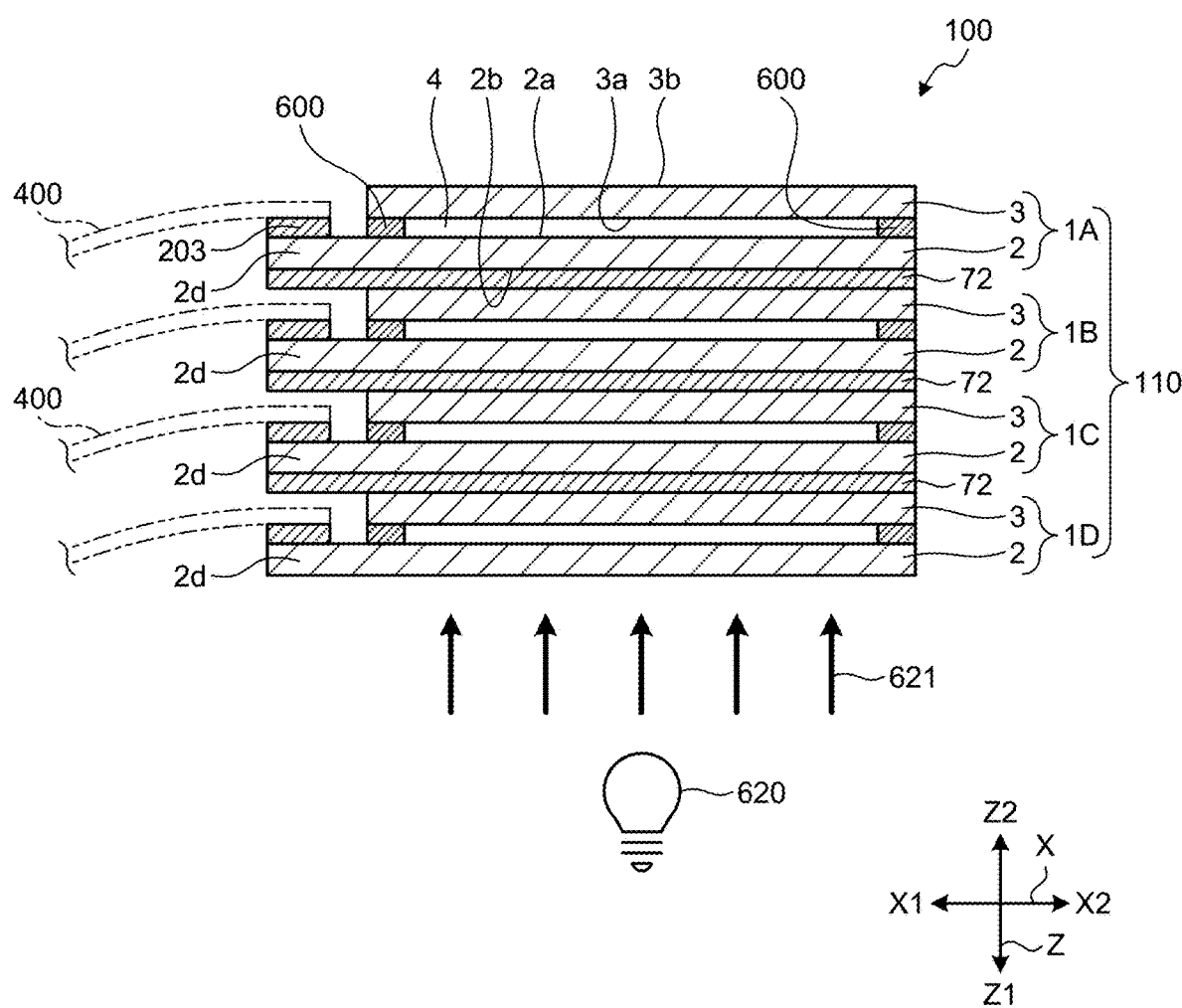
FIG. 5 is a schematic diagram illustrating a section of a light adjustment device according to the embodiment.

The following describes the light adjustment device according to the embodiment. FIG. 5 is a schematic diagram illustrating a section of the light adjustment device according to the embodiment.

As illustrated in FIG. 5, a light adjustment device 100 according to the embodiment includes a panel unit 110 and a light source 620. In the light adjustment device 100 according to the present embodiment, a liquid crystal cell for p-wave polarization and a liquid crystal cell for s-wave polarization are stacked and combined.

The panel unit 110 is formed by stacking a plurality of the light adjustment panels 1 in the Z direction (first direction). In the present embodiment, a plurality (in the embodiment, four) of light adjustment panels 1 illustrated in FIG. 1 are stacked. Specifically, as illustrated in FIG. 5, the four light adjustment panels 1 include a first light adjustment panel 1A, a second light adjustment panel 1B, a third light adjustment panel 1C, and a fourth light adjustment panel 1D stacked in order from the upper side. The first light adjustment panel 1A is disposed closest to the upper side among the four light adjustment panels 1. In other words, the first light adjustment panel 1A is positioned closest to the Z2 side among the light adjustment panels. The fourth light adjustment panel 1D is disposed closest to the lower side among the four light adjustment panels 1. In other words, the fourth light adjustment panel 1D is positioned closest to the Z1 side among the light adjustment panels. The second light adjustment panel 1B and the third light adjustment panel 1C are stacked between the first light adjustment panel 1A and the fourth light adjustment panel 1D. The light adjustment panels 1A, 1B, 1C, and 1D are bonded to each other through a bonding layer 72. Accordingly, all light adjustment panels adjacent to each other in the Z direction are bonded to each other through the bonding layer 72. Flexible printed boards 400 are electrically coupled to the terminals. The number of light adjustment panels 1 included in the light adjustment device 100 is not limited to four but only needs to be two or more. The light source 620 is disposed on the Z1 side of the panel unit 110. Light 621 is irradiated from the light source 620.

Figure 6:
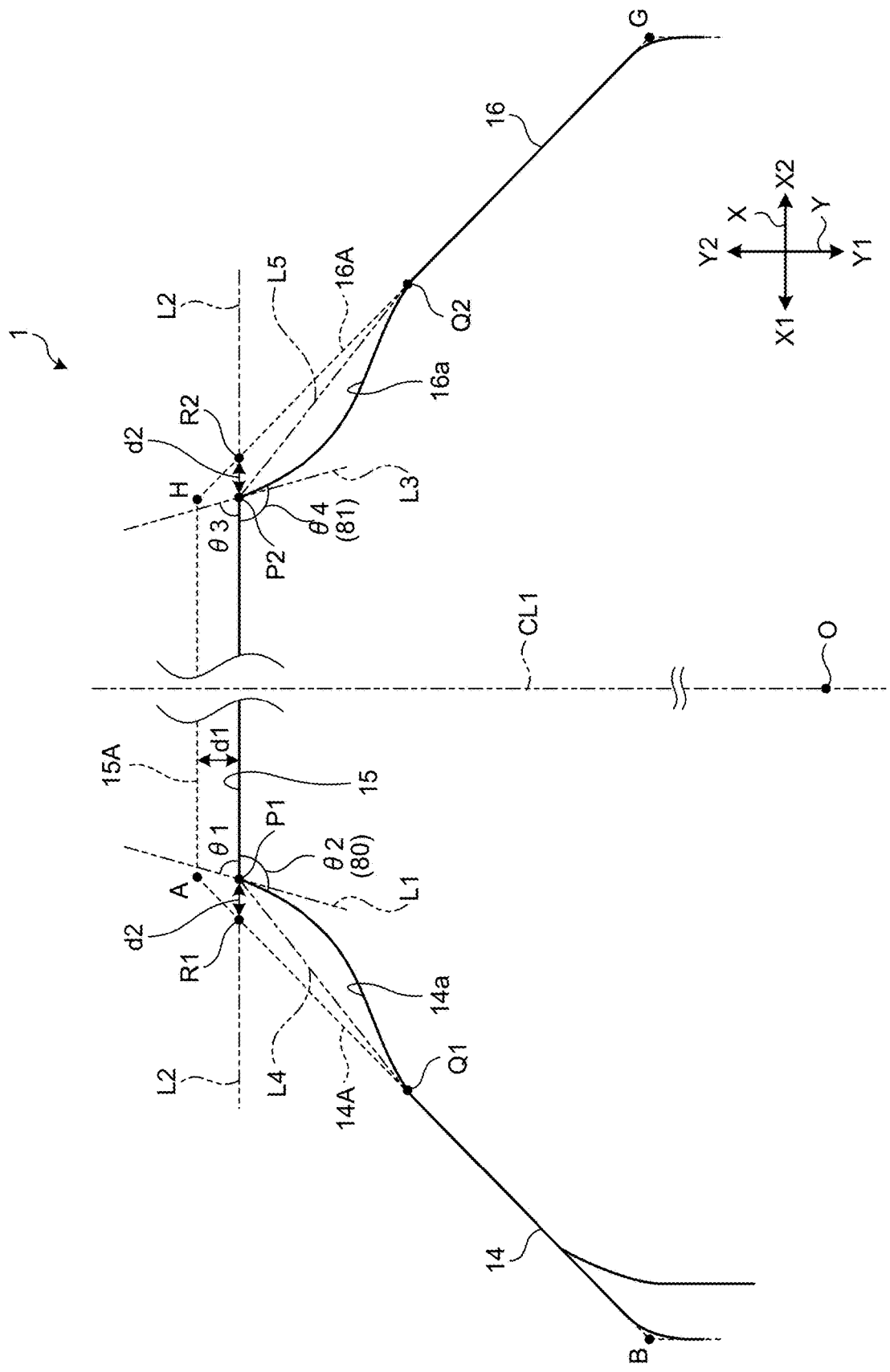
FIG. 6 is an enlarged schematic diagram of part of FIG. 1.

The following describes corners of each light adjustment panel 1 in detail. FIG. 6 is an enlarged schematic diagram of part of FIG. 1.

As illustrated in FIG. 6, each light adjustment panel 1 has an octagonal shape (polygonal shape) and has the sides 14, 15, and 16. As described above, the side 15 of the light adjustment panel 1 corresponds to the side 15A of the regular octagon on the Y2 side. The side 15 of the light adjustment panel 1 is positioned on the Y1 side of the side 15A of the regular octagon on the Y2 side. The distance between the side 15 and the side 15A is a distance d1.

The side 15 is referred to as a first side and the side 14 is referred to as a second side, as the side 15 (first side) and the side 14 (second side) are adjacent to each other. An end part of the side 14 includes a curved part 14a. The side 15 (first side) intersects the curved part 14a of the side 14 (second side) at a point P1, thereby forming a first corner 80. The side 15 intersects the curved part 14a at an internal angle θ2 larger than 90° at the first corner 80. A straight line L1 is the tangent line of the curved part 14a passing through the point P1. The straight line L1 intersects the side 15 at an angle θ1. The angle θ1 is smaller than 90°. A straight line L2 is an extended line of the side 15. The regular octagon illustrated with dashed lines has a side 14A. The side 14A intersects the straight line L2 at an intersection point R1. The point P1 is disposed on the X2 side (central line CL1 side) of the intersection point R1. The distance between the point P1 and the intersection point R1 is a distance d2. The curved part 14a extends from a point Q1 to the point P1. The curved part 14a is positioned on the center O side of a straight line L4 connecting the points Q1 and P1.

The side 15 is referred to as a first side and the side 16 is referred to as a second side, as the side 15 (first side) and the side 16 (second side) are adjacent to each other. An end part of the side 16 includes a curved part 16a. The side 15 (first side) intersects the curved part 16a of the side 16 (second side) at a point P2, thereby forming a first corner 81. The side 15 intersects the curved part 16a at an internal angle θ4 larger than 90° at the first corner 81. A straight line L3 is the tangent line of the curved part 16a passing through the point P2. The straight line L3 intersects the side 15 at an angle θ3. The angle θ3 is smaller than 90°. The straight line L2 is an extended line of the side 15. The regular octagon illustrated with dashed lines has a side 16A. The side 16A intersects the straight line L2 at an intersection point R2. The point P2 is disposed on the X1 side (central line CL1 side) of the intersection point R2. The distance between the point P2 and the intersection point R2 is the distance d2. The curved part 16a extends from a point Q2 to the point P2. The curved part 16a is positioned on the center O side of a straight line L5 connecting the points Q2 and P2.

Figure 14:
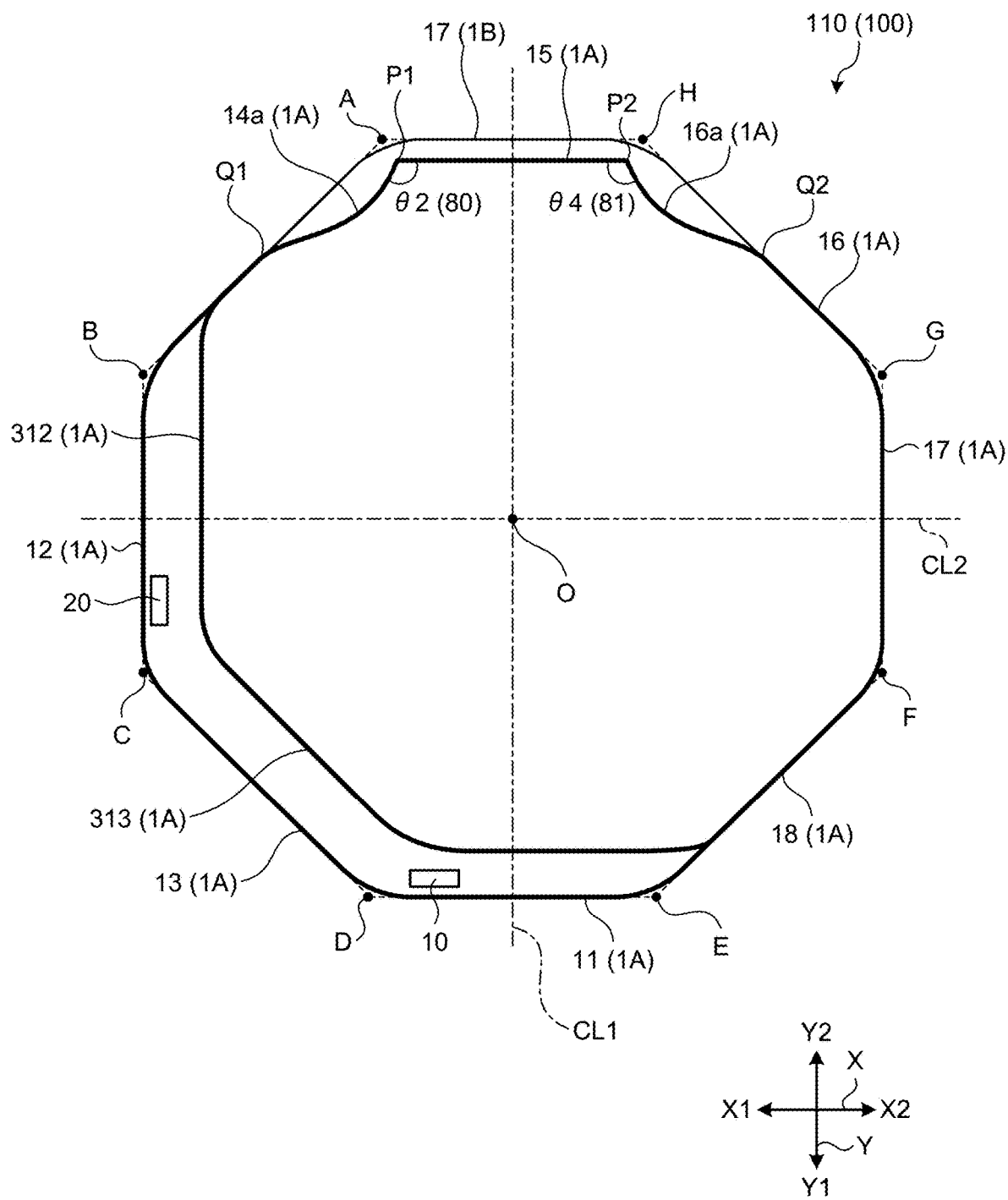
FIG. 14 is a schematic diagram of the panel unit according to the embodiment when viewed from the upper side.

In the light adjustment device 100 according to the embodiment, as illustrated in FIG. 14, when two light adjustment panels 1 adjacent to each other in the Z direction is viewed in the Z direction, the first corners 80 and 81 of one of the light adjustment panels 1 are positioned inside (the center O side) of the edge of the other light adjustment panel 1, and the first corners 80 and 81 of the other light adjustment panel 1 are positioned inside (the center O side) of the edge of the one light adjustment panel 1, which will be specifically described later. As illustrated in FIG. 1, each light adjustment panel 1 is provided with second corners 82, 83, 84, 85, 86, and 87 other than the first corners 80 and 81. The second corner 82 is a corner at which the side 14 intersects the side 12. The second corner 83 is a corner at which the side 13 intersects the side 12. The second corner 84 is a corner at which the side 13 intersects the side 11. The second corner 85 is a corner at which the side 11 intersects the side 18. The second corner 86 is a corner at which the side 18 intersects the side 17. The second corner 87 is a corner at which the side 17 intersects the side 16. The second corners 82, 83, 84, 85, 86, and 87 are formed in circular arc shapes. The second corners 82, 83, 84, 85, 86, and 87 have the same internal angle larger than those of the first corners 80 and 81.

Light Adjustment Device Manufacturing Method

Figure 7:
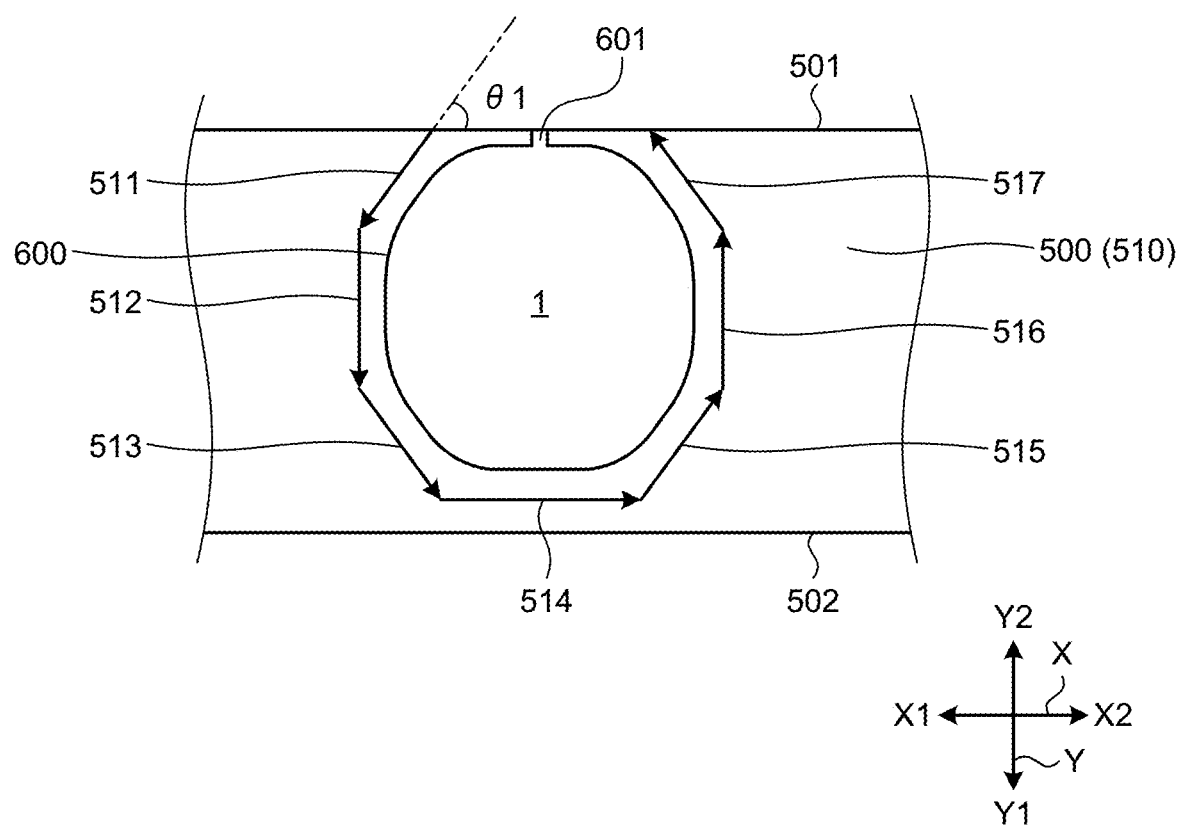
FIG. 7 is a schematic diagram illustrating a procedure of cutting out one light adjustment panel from a base material.
Figure 8:
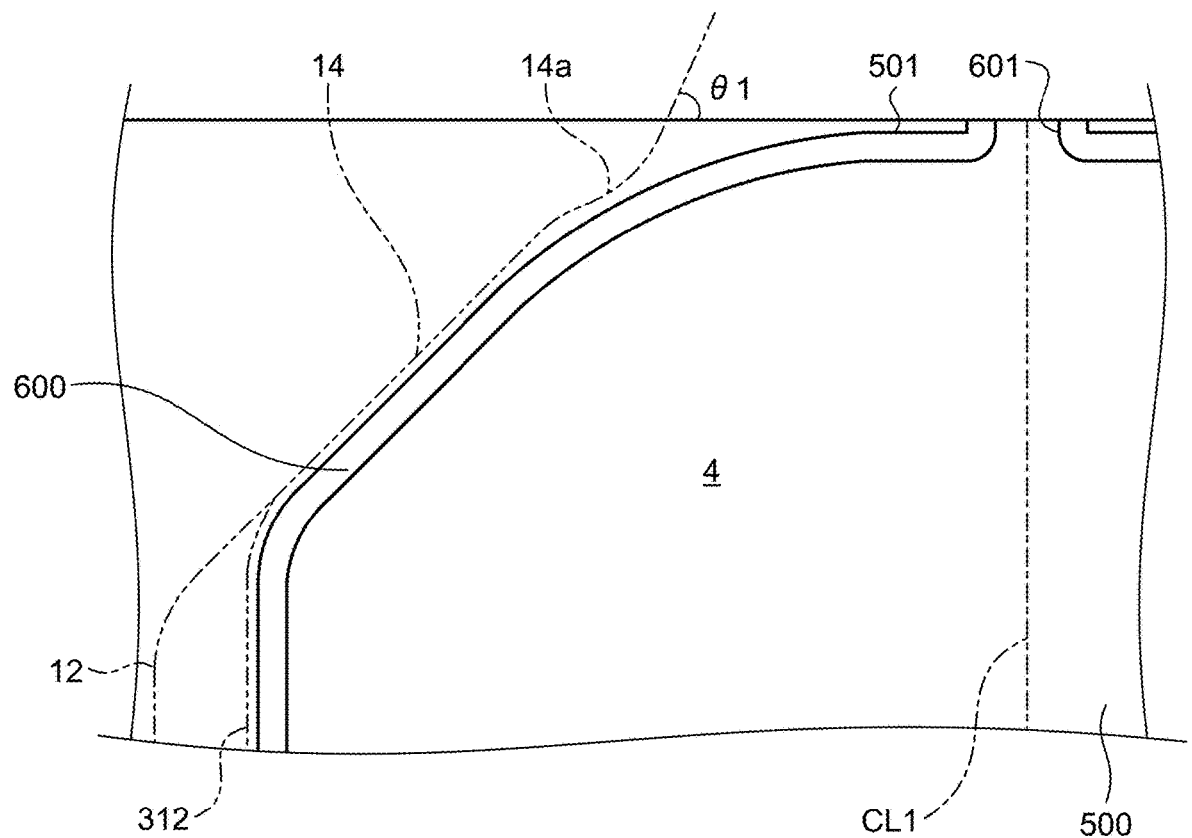
FIG. 8 is an enlarged schematic diagram of part of FIG. 7.
Figure 8:
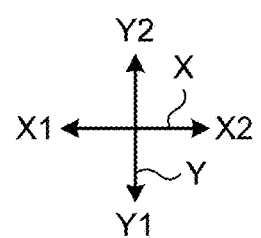
Figure 9:
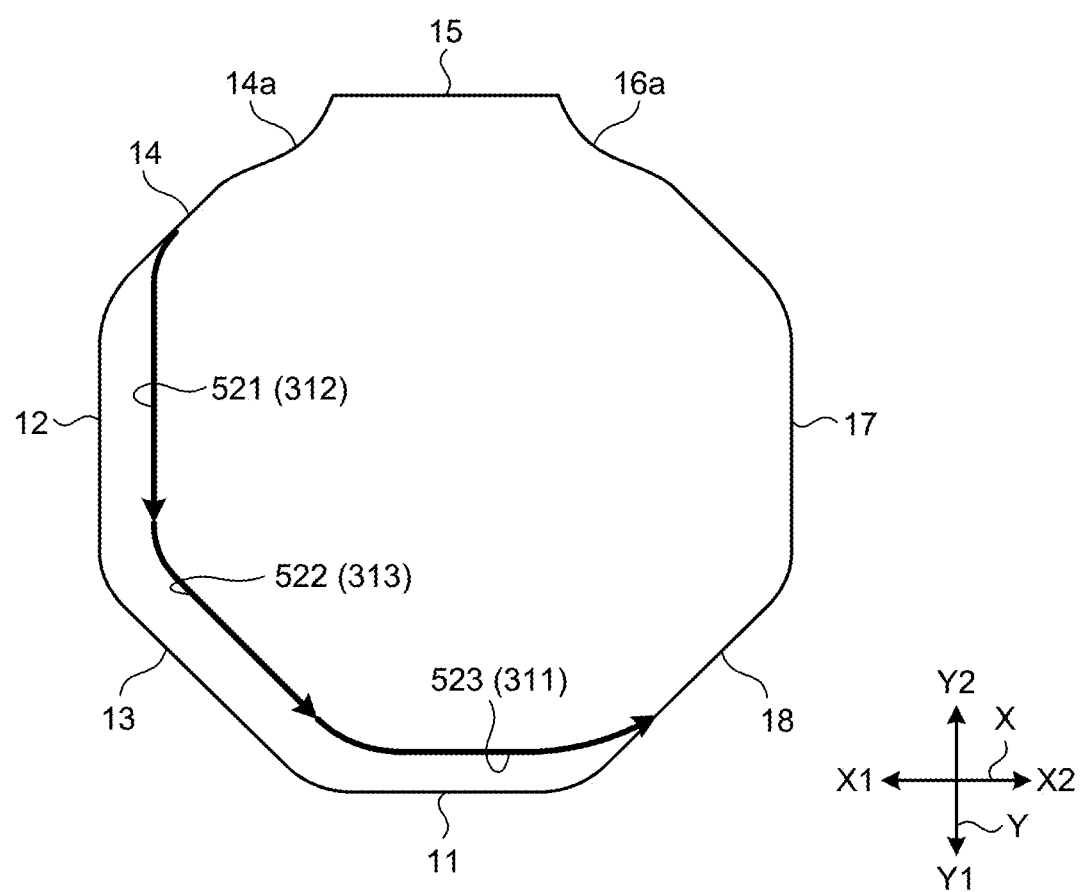
FIG. 9 is a schematic diagram illustrating a procedure of cutting part of the upper substrate from the light adjustment panel.
Figure 10:
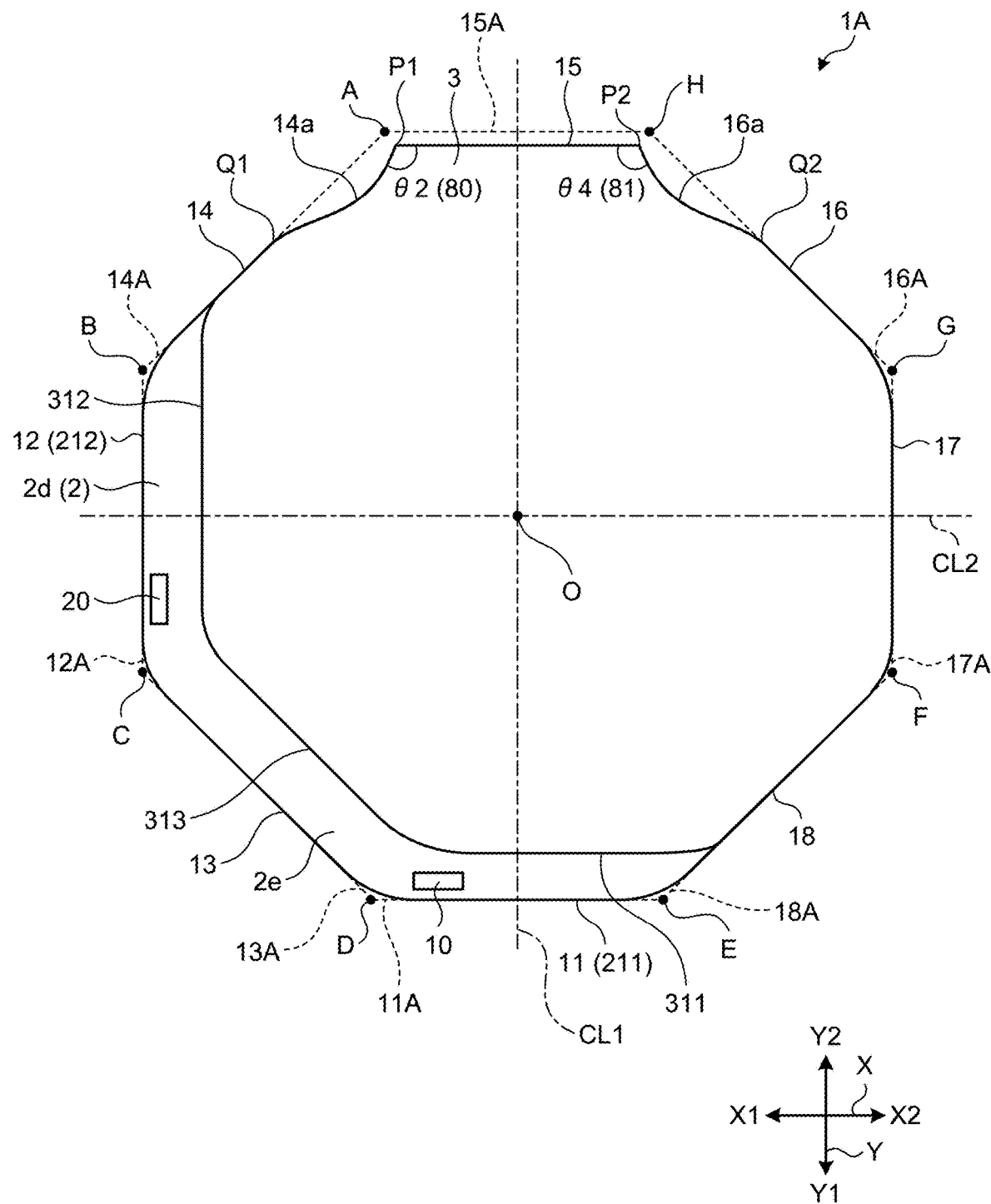
FIG. 10 is a schematic diagram illustrating a first light adjustment panel positioned closest to the upper side in a panel unit.
Figure 11:
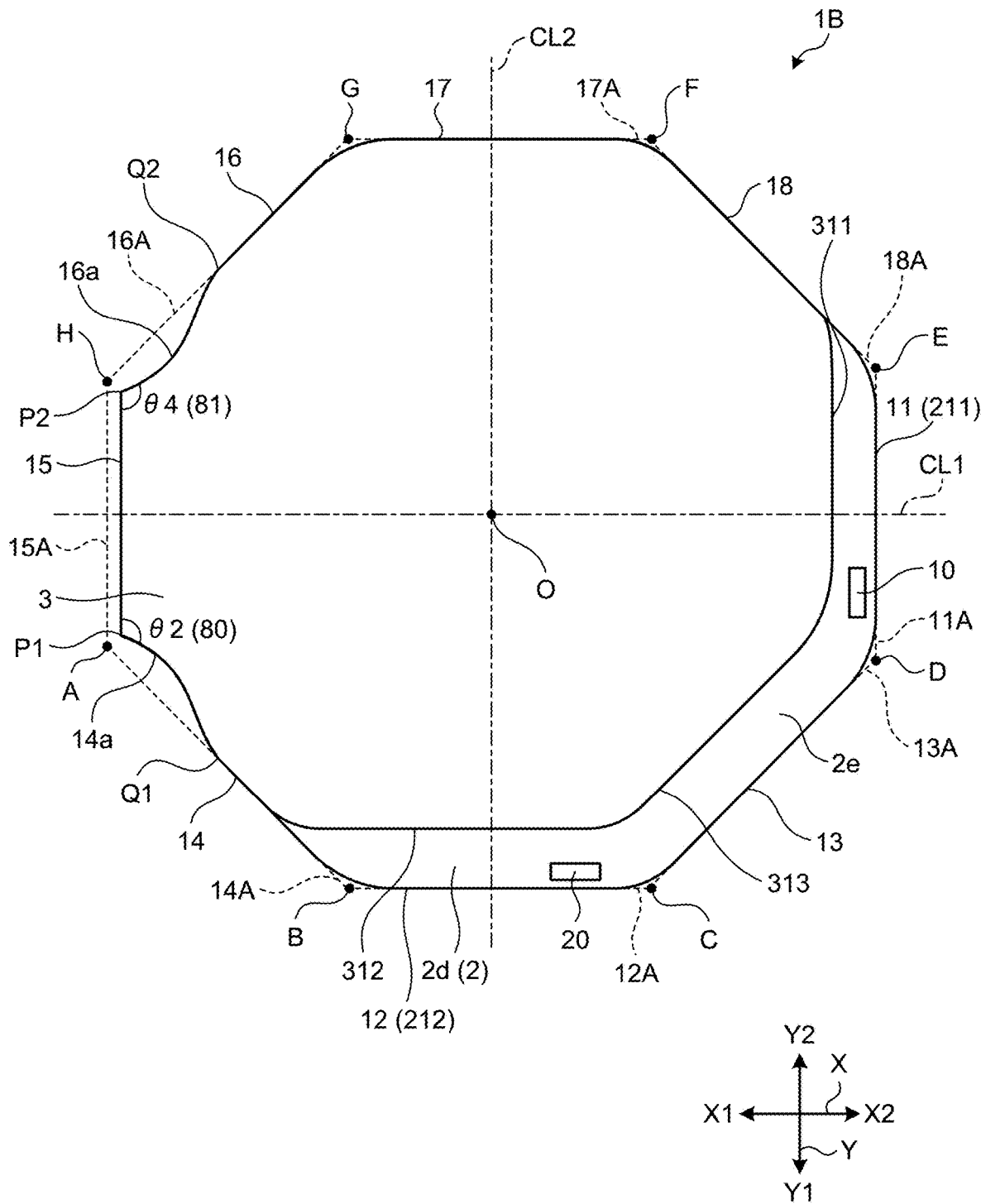
FIG. 11 is a schematic diagram illustrating a second light adjustment panel positioned second closest to the upper side in the panel unit.
Figure 12:
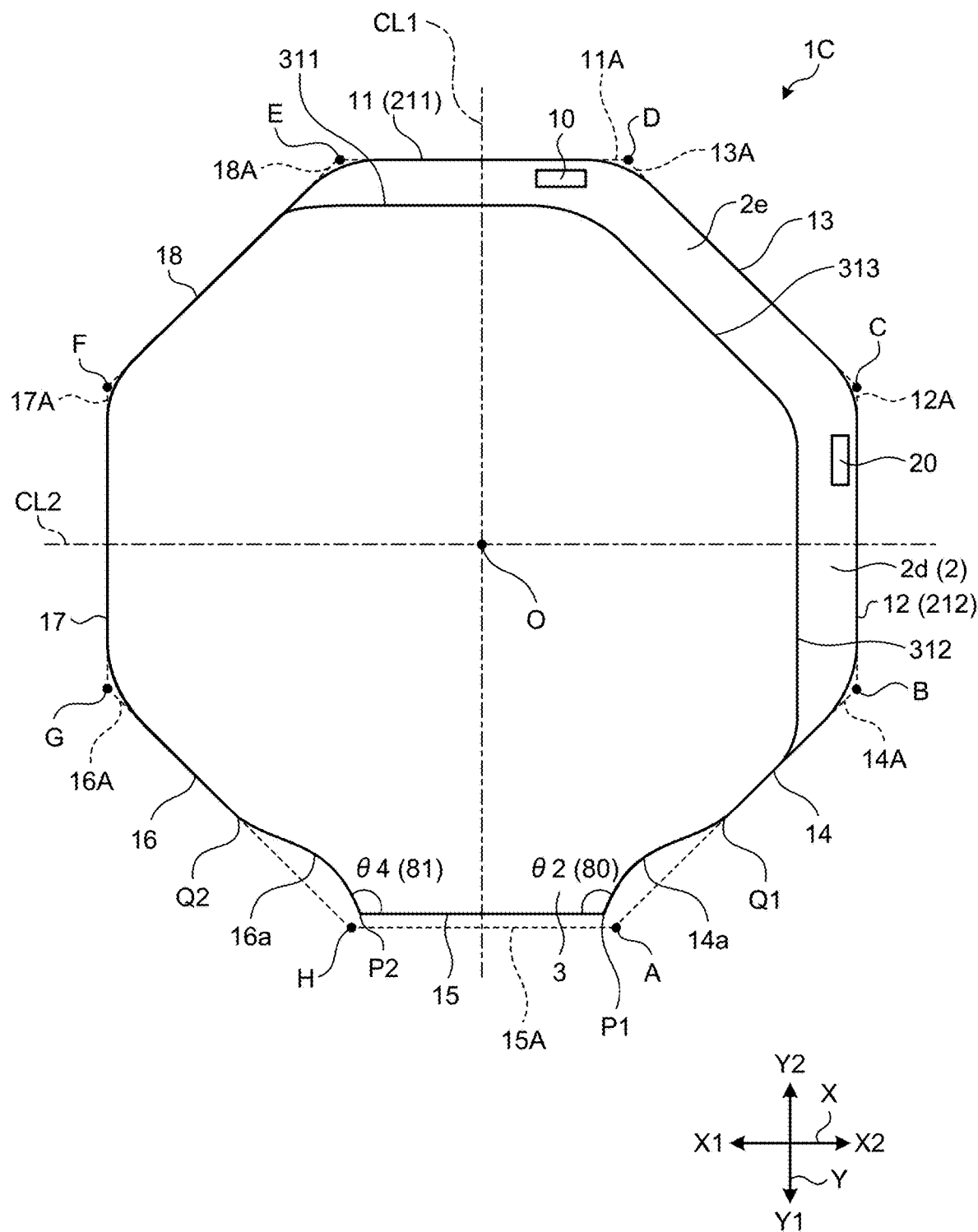
FIG. 12 is a schematic diagram illustrating a third light adjustment panel positioned third closest to the upper side in the panel unit.
Figure 13:
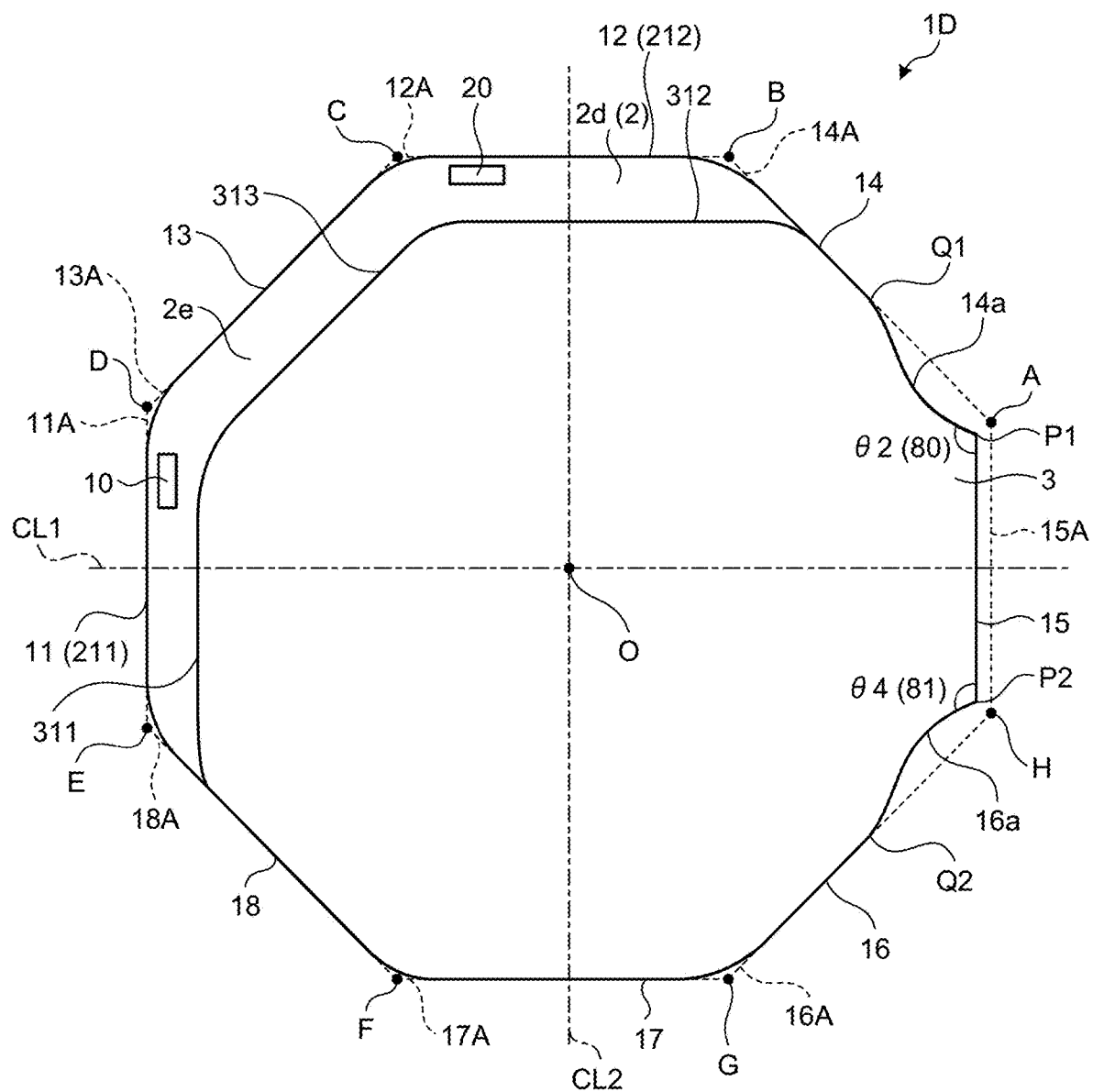
FIG. 13 is a schematic diagram illustrating a fourth light adjustment panel positioned fourth closest to the upper side in the panel unit.

The following describes a light adjustment device manufacturing method. FIG. 7 is a schematic diagram illustrating a procedure of cutting out one light adjustment panel from a base material. FIG. 8 is an enlarged schematic diagram of part of FIG. 7. FIG. 9 is a schematic diagram illustrating a procedure of cutting part of the upper substrate from the light adjustment panel. FIG. 10 is a schematic diagram illustrating a first light adjustment panel positioned closest to the upper side in the panel unit. FIG. 11 is a schematic diagram illustrating a second light adjustment panel positioned second closest to the upper side in the panel unit. FIG. 12 is a schematic diagram illustrating a third light adjustment panel positioned third closest to the upper side in the panel unit. FIG. 13 is a schematic diagram illustrating a fourth light adjustment panel positioned fourth closest to the upper side in the panel unit. FIG. 14 is a schematic diagram of the panel unit according to the embodiment when viewed from the upper side.

The light adjustment device manufacturing method includes a base material preparation process, a light adjustment panel cut-out process, a light adjustment panel production process, and a stacking process.

Base Material Preparation Process

In the base material preparation process, a base material 500 is prepared. As illustrated in FIGS. 7 and 8, the base material 500 includes two rectangular translucent substrates 510 placed over each other, the seal material 600 disposed between the two translucent substrates 510, and the liquid crystal layer 4 that fills the inside of the seal material 600. Each translucent substrate 510 has a rectangular shape extending in the X direction. Each translucent substrate 510 has an end face 501 on the Y2 side and an end face 502 on the Y1 side. As illustrated in FIG. 8, the seal material 600 is provided along the edge of the upper substrate 3. The seal material 600 has an inflow port 601 at an end part on the Y2 side. Liquid crystal is injected to the inside of the seal material 600 through the inflow port 601, and accordingly, the liquid crystal layer 4 is formed.

Light Adjustment Panel Cut-Out Process

The light adjustment panel cut-out process is performed after the base material preparation process. In the light adjustment panel cut-out process, one light adjustment panel 1 having an octagonal shape (polygonal shape) is cut out from the base material 500 as illustrated in FIG. 7. Specifically, in the light adjustment panel cut-out process, the light adjustment panel 1 is cut out by providing slits 511, 512, 513, 514, 515, 516, and 517 that are continuous with each other to the base material 500. The slits are performed by using, for example, a blade. The slit 511 is also referred to as a first slit. The slit (first slit) 511 is provided from the end face 501 of each translucent substrate 510 in a direction intersecting the end face 501. The slit 511 forms the first corner 80 at which the slit 511 intersects the end face 501. The intersection angle between the direction of the slit (first slit) 511 and the end face 501 is the angle θ1. The angle θ1 is smaller than 90°. Specifically, the slit (first slit) 511 forms the side 14 including the curved part 14a as illustrated in FIG. 8. In other words, the curved part 14a is formed right after the slit (first slit) 511 is provided, and thereafter, any other site of the side 14 than the curved part 14a is cut straight.

The orientation of the blade is changed at the end part of the side 14 to provide the slit 512, thereby forming the side 12. Subsequently, the blade is moved and the orientation thereof is changed in the same manner to form the sides 13, 11, 18, and 17. At the slit for the side 16, the curved part 16a is formed as illustrated in FIG. 6, and then, the blade is removed from the end face 501. In this manner, the slits are continuously formed up to the end face 501 along the outer periphery of the seal material 600 in the light adjustment panel cut-out process.

Light Adjustment Panel Production Process

In the light adjustment panel production process, the above-described light adjustment panel cut-out process is repeatedly performed to produce a plurality (in the present embodiment, four) of light adjustment panels 1.

Upper Substrate Cut Process

An upper substrate cut process is performed after the light adjustment panel production process. As illustrated in FIG. 9, the upper substrate 3 is cut by providing slits 521, 522, and 523. Accordingly, the sides 312, 313, and 311 of the upper substrate 3 are formed, and a plurality (for example, four) of the light adjustment panels 1 are obtained.

Stacking Process

After the upper substrate cut process, the stacking process is performed to form the panel unit 110. In the stacking process, the plurality (for example, four) of light adjustment panels 1 are stacked in the Z direction. In the stacking process, a light adjustment panel 1 on the Z2 side among two light adjustment panels 1 adjacent to each other in the Z direction is disposed in a state in which the light adjustment panel 1 is rotated relative to the other light adjustment panel 1 on the Z1 side about the center O. Description below is made on disposition of the four light adjustment panels 1.

As illustrated in FIG. 10, the light adjustment panel 1A (first light adjustment panel) disposed closest to the upper side (the Z2 side or the one side in the first direction) in the panel unit 110 has the side 15 positioned on the Y2 side and the side 11 positioned on the Y1 side.

As illustrated in FIG. 11, the light adjustment panel 1B (second light adjustment panel) disposed second closest to the upper side in the panel unit 110 is equivalent to the light adjustment panel 1A (first light adjustment panel) being rotated by 90° in the anticlockwise direction (leftward direction) about the center O. The light adjustment panel 1B (second light adjustment panel) has the side 15 positioned on the X1 side and the side 11 positioned on the X2 side.

As illustrated in FIG. 12, the light adjustment panel 1C (third light adjustment panel) disposed third closest to the upper side in the panel unit 110 is equivalent to the light adjustment panel 1B (second light adjustment panel) being rotated by 90° in the anticlockwise direction (leftward direction) about the center O. The light adjustment panel 1C (third light adjustment panel) has the side 15 positioned on the Y1 side and the side 11 positioned on the Y2 side.

As illustrated in FIG. 13, the light adjustment panel 1D (fourth light adjustment panel) disposed fourth closest to the upper side in the panel unit 110 is equivalent to the light adjustment panel 1C (third light adjustment panel) being rotated by 90° in the anticlockwise direction (leftward direction) about the center O. The light adjustment panel 1D (fourth light adjustment panel) has the side 15 positioned on the X2 side and the side 11 positioned on the X1 side.

The four light adjustment panels 1A, 1B, 1C, and 1D are stacked in the Z direction to form the panel unit 110 illustrated in FIG. 14. As illustrated in FIG. 14, when two light adjustment panels 1 adjacent to each other in the Z direction in the panel unit 110 are viewed in the Z direction, the first corners 80 and 81 of one of the light adjustment panels 1 are positioned inside (the center O side) of the edge of the other light adjustment panel 1, and the first corners 80 and 81 of the other light adjustment panel 1 are positioned inside (the center O side) of the edge of the one light adjustment panel 1. Specifically, for example, the first corners 80 and 81 of the first light adjustment panel 1A are positioned inside (the center O side) of the edge of the second light adjustment panel 1B, and the first corners 80 and 81 of the second light adjustment panel 1B are positioned inside (the center O side) of the edge of the first light adjustment panel 1A. In this manner, the first corners 80 and 81 of one of each two light adjustment panels 1 adjacent to each other in the Z direction among the four light adjustment panels 1A, 1B, 1C, and 1D are positioned inside (the center side) of the edge of the other light adjustment panel 1, and the first corners 80 and 81 of the other light adjustment panel 1 are positioned inside (the center O side) of the edge of the one light adjustment panel 1.

As described above, the light adjustment device 100 includes the panel unit 110. The panel unit 110 has a rectangular pillar shape and includes the plurality of light adjustment panels 1 stacked in the Z direction, each light adjustment panel 1 having a polygonal shape and including the lower substrate 2 and the upper substrate 3 overlapping the lower substrate 2. The light adjustment panels 1 each have the side 15 (first side), the side 14 (second side) adjacent to the side 15, and the first corner at which the side 15 intersects the side 14. When two light adjustment panels 1 adjacent to each other in the Z direction are viewed in the Z direction, the first corners and 81 of one of the light adjustment panels 1 are positioned inside (the center O side) of the edge of the other light adjustment panel 1, and the first corners 80 and 81 of the other light adjustment panel 1 are positioned inside (the center O side) of the edge of the one light adjustment panel 1.

According to JP-A-2004-333567 as described above, when a corner of any of the plurality of light adjustment panels stacked in the up-down direction protrudes from a side part of a panel unit, the corner is potentially damaged due to interference with another component or the like.

However, in the panel unit 110 according to the present embodiment, when two light adjustment panels 1 adjacent to each other in the Z direction are viewed in the Z direction, the first corners 80 and 81 of one of the light adjustment panels 1 are positioned inside (the center side) of the edge of the other light adjustment panel 1, and the first corners 80 and 81 of the other light adjustment panel 1 are positioned inside (the center O side) of the edge of the one light adjustment panel 1. Accordingly, no first corner 80 protrudes from a side part of the panel unit 110, and thus damage on the first corner can be reduced. Moreover, when the first corner 80 has a shaping defect such as a burr, the burr or the like does not protrude from a side part of the panel unit 110, and thus a hand of a worker is prevented from being caught by the burr or the like in a manufacturing process, which would otherwise interrupt work.

The side 15 (first side) intersects the side 14 (second side) at the internal angle θ2 larger than 90° at the first corner 80 of the first light adjustment panel LA (predetermined light adjustment panel 1). The slit 511 (first slit) intersects the end face 501 at the internal angle θ2 larger than 90° at the first corner 80.

The corner is sharper when the internal angle θ2 is smaller than 90°. Thus, damage on the corner can be reduced by increasing the internal angle θ2.

The light adjustment device manufacturing method includes: the base material preparation process of preparing the base material 500 including the seal material 600 and the liquid crystal layer 4 between two translucent substrates 510 having rectangular shapes and placed over each other in the Z direction; after the base material preparation process, the light adjustment panel cut-out process of cutting out one light adjustment panel 1 having a polygonal shape from the base material 500 by providing the slit 511 (first slit) from the end face 501 of each translucent substrate 510 in a direction intersecting the end face 501 and then continuously forming slits up to the end face 501 along the outer periphery of the seal material 600, the polygonal shape having the end face 501 as one side; the light adjustment panel production process of producing a plurality of the light adjustment panels 1 by repeatedly performing the light adjustment panel cut-out process; and the stacking process of stacking the light adjustment panels 1 in the Z direction after the light adjustment panel production process. In the stacking process, a light adjustment panel 1 on the Z2 side among two light adjustment panels 1 adjacent to each other in the Z direction is disposed in a state in which the light adjustment panel 1 is rotated relative to the other light adjustment panel 1 on the Z1 side about the center O (central part) of each light adjustment panel 1 when the light adjustment panel 1 is viewed in the Z direction. In addition, the panel unit 110 is formed through the stacking process. When the panel unit 110 is viewed in the Z direction, when two light adjustment panels 1 adjacent to each other in the Z direction are viewed in the Z direction, the first corners 80 and 81 of one of the light adjustment panels 1 are positioned inside (the center O side) of the edge of the other light adjustment panel 1, and the first corners 80 and 81 of the other light adjustment panel 1 are positioned inside (the center O side) of the edge of the one light adjustment panel 1.

Thus, it is possible to more easily manufacture the light adjustment device 100 in which protrusion of the first corner 80 from a side part of the panel unit 110 is prevented. Specifically, it is possible to prevent protrusion of the first corner 80 from a side part of the panel unit 110 by a simple method of sequentially stacking, in the up-down direction, the plurality of light adjustment panels 1 rotated about the center O.

What is claimed is:

1. A light adjustment device comprising a panel unit having a rectangular pillar shape and including a plurality of light adjustment panels stacked in a first direction, each light adjustment panel having a polygonal shape and including a lower substrate and an upper substrate overlapping the lower substrate, wherein
    the light adjustment panels each have a first side, a second side adjacent to the first side, and a first corner at which the first side intersects the second side, and
    when two light adjustment panels adjacent to each other in a first direction among the light adjustment panels are viewed in the first direction, the first corner of one of the light adjustment panels is positioned inside of an edge of the other light adjustment panel, and the first corner of the other light adjustment panel is positioned inside of an edge of the one light adjustment panel, an end part of the second side having a curved part, the first side intersecting the curved part so as to form the first corner.

2. The light adjustment device according to claim 1, wherein the first side intersects the second side at an internal angle larger than 90° at the first corner of each light adjustment panel.

* * * * *